United States Patent
Jiang et al.

(10) Patent No.: US 10,331,496 B2
(45) Date of Patent: Jun. 25, 2019

(54) RUNTIME DISPATCHING AMONG A HEREROGENEOUS GROUPS OF PROCESSORS

(71) Applicant: INTEL CORPORATION, Santa Clara, CA (US)

(72) Inventors: Yong Jiang, Shanghai (CN); Ruijia Li, Shanghai (CN); Lei Shen, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 135 days.

(21) Appl. No.: 15/019,943

(22) Filed: Feb. 9, 2016

(65) Prior Publication Data
US 2016/0239351 A1    Aug. 18, 2016

Related U.S. Application Data

(63) Continuation of application No. 13/977,315, filed as application No. PCT/CN2012/076285 on May 30, 2012, now Pat. No. 9,280,395.

(51) Int. Cl.
| G06F 9/45 | (2006.01) |
| G06F 9/50 | (2006.01) |
| G06F 8/52 | (2018.01) |
| G06F 9/48 | (2006.01) |
| G06F 9/455 | (2018.01) |

(52) U.S. Cl.
CPC .............. *G06F 9/5094* (2013.01); *G06F 8/52* (2013.01); *G06F 9/4552* (2013.01); *G06F 9/4881* (2013.01); *G06F 9/505* (2013.01); *Y02D 10/22* (2018.01)

(58) Field of Classification Search
CPC ...... G06F 9/5027; G06F 9/505; G06F 9/5044; G06F 9/4856; G06F 9/5083; G06F 8/456; G06F 1/206; G06F 15/7867; G06F 9/54; G06F 8/45; G06F 9/5094; G06F 9/4552; G06T 1/20; H04L 67/1029
See application file for complete search history.

(56) References Cited

U.S. PATENT DOCUMENTS

| 9,280,395 | B2 | 3/2016 | Jiang et al. | |
| 2001/0049713 | A1* | 12/2001 | Arnold | G06F 9/5044 718/105 |
| 2002/0010783 | A1* | 1/2002 | Primak | G06F 9/505 709/228 |
| 2005/0278712 | A1 | 12/2005 | Buskens et al. | |

(Continued)

FOREIGN PATENT DOCUMENTS

| CN | 102402419 A | 4/2012 |
| WO | 2008127623 A2 | 10/2008 |

OTHER PUBLICATIONS

Bosschere et al., "High-Performance Embedded Architecture and Compilation Roadmap", LNCS 2007, pp. 5-29.
(Continued)

*Primary Examiner* — Tuan A Vu
(74) *Attorney, Agent, or Firm* — Jaffery, Watson, Mendonsa & Hamilton LLP

(57) ABSTRACT

Systems, apparatus, articles, and methods are described including operations for runtime dispatching among a heterogeneous group of processors.

20 Claims, 6 Drawing Sheets

(56) References Cited

U.S. PATENT DOCUMENTS

| | | | |
|---|---|---|---|
| 2006/0098019 A1* | 5/2006 | Tarditi, Jr. | G06F 8/45 345/505 |
| 2008/0163183 A1* | 7/2008 | Li | G06F 8/456 717/149 |
| 2008/0276262 A1 | 11/2008 | Munshi | |
| 2008/0286262 A1 | 11/2008 | Zhang | |
| 2009/0106571 A1* | 4/2009 | Low | G06F 9/4856 713/310 |
| 2009/0328012 A1 | 12/2009 | Aharoni et al. | |
| 2010/0122105 A1* | 5/2010 | Arslan | G06F 15/7867 713/500 |
| 2010/0156888 A1* | 6/2010 | Luk | G06T 1/20 345/418 |
| 2010/0299658 A1 | 11/2010 | Ng et al. | |
| 2011/0066828 A1 | 3/2011 | Wolfe | |
| 2011/0153840 A1* | 6/2011 | Narayana | H04L 67/1029 709/227 |
| 2011/0213950 A1 | 9/2011 | Mathieson | |
| 2011/0213994 A1 | 9/2011 | Thereska et al. | |
| 2012/0079235 A1 | 3/2012 | Iyer | |
| 2012/0159052 A1 | 6/2012 | Lee et al. | |
| 2012/0271481 A1* | 10/2012 | Anderson | G06F 1/206 700/299 |
| 2012/0291040 A1* | 11/2012 | Breternitz | G06F 9/5083 718/104 |
| 2012/0297395 A1* | 11/2012 | Marchand | G06F 9/5027 718/104 |
| 2013/0300752 A1* | 11/2013 | Grover | G06F 9/54 345/520 |
| 2014/0317389 A1* | 10/2014 | Wenisch | G06F 1/20 712/229 |
| 2015/0095896 A1 | 4/2015 | Jiang et al. | |

OTHER PUBLICATIONS

International Preliminary Report on Patentability and Written Opinion for PCT/CN2012/076285, dated Dec. 11, 2014, 6 pages.
International Search Report and Written Opinion for PCT Patent Appliation No. PCT/CN2012/076285 dated Mar. 7, 2013, 11 pages.
Non Final Office Action in U.S. Appl. No. 13/977,315 dated Jun. 4, 2015.
Notice of Allowance in U.S. Appl. No. 13/977,315 dated Oct. 29, 2015.
Official Letter and Search Report of R.O.C. Patent Application No. 102115881, dated July 21, 2016, 7 pages.
Extended European Search Report for Application No. 12 877 879.2 / PCT/CN/2012078285, dated Jan. 16, 2018, 11 pages.
Communication Pursuant to Article 94(3) EPC for Application No. 12 877 879.2-1224, dated Sep. 27, 2018, 5 pages.

* cited by examiner

RUNTIME DISPATCHING AMONG A HEREROGENEOUS GROUPS OF PROCESSORS

BACKGROUND

Modern computing devices including tablets, laptops, mobile Internet devices (MID), smartphones, and/or the like may typically be equipped with heterogeneous processing engines. For example, such heterogeneous processing engines might include a primary central processing unit (CPU), assistant CPU (e.g., as may be common in smart phone implementations), a graphics processing unit (GPU), a digital signal processor (DSP), the like, and/or combinations thereof.

The determination of which computing operations would happen on which processing engines is currently defined at design time (e.g., defined at the time of designing a given active application) instead of run time (e.g., decided at the time of designing a given active application). In some situations, computing might run faster on GPU but also might consume more power as compared to a CPU, or the other way round. Computing might also run faster if executed both at a CPU and a GPU instead of just at the CPU or just at the GPU. Accordingly, a given active application might have been adapted at design time to have a predetermined assignment of which computing operations would happen on which processing engines.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
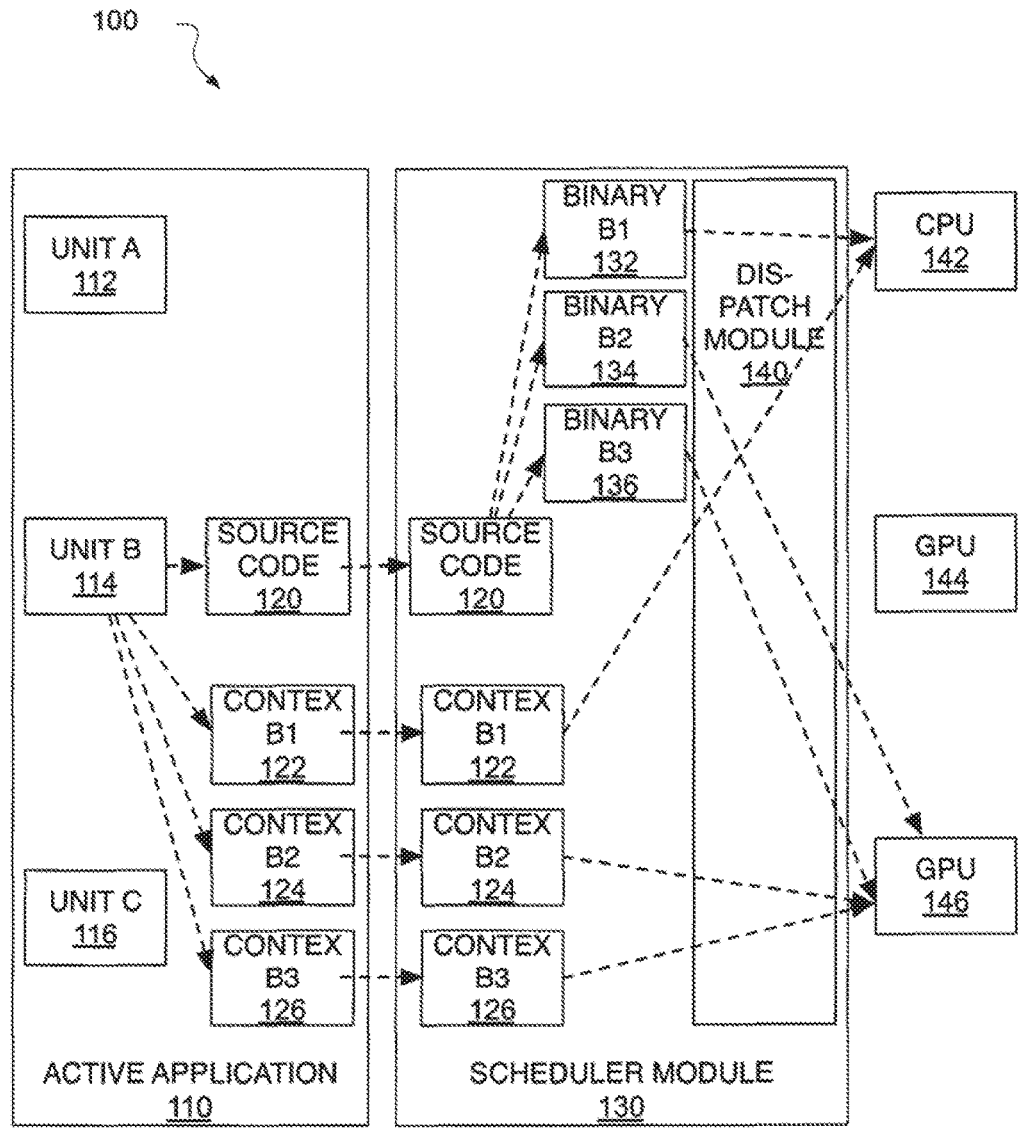
FIG. 1 is an illustrative diagram of an example runtime dispatching system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for runtime dispatching among a heterogeneous group of processors.

As described above, in some cases, the determination of which computing operations would happen on which processing engines is typically defined at design time (e.g., defined at the time of designing a given active application) instead of run time (e.g., decided at the time of designing a given active application). In some situations, computing might run faster on GPU but also might consume more power as compared to a CPU, or the other way round. Accordingly, a given active application might have been adapted at design time to have a predetermined assignment of which computing operations would happen on which processing engines.

For example, Khronos OpenCL™-type active applications might be designed to compile computing tasks to different processing engine based on predetermined assignments set at design time. Further, for such OpenCL™-type active applications, the function of dispatching tasks to different processing engines may have to be handled by the active application itself. For example, OpenCL™ may be capable of compiling the same code to multiple types of CPUs and GPUs with instruction from the active application. Such an active application could decide which processing engine they would like to run on; however, in most cases active applications typically just dispatch all tasks to one type of processing engine. Accordingly, there currently may be no meaningful runtime dispatching.

Further, The Microsoft DirectX® GPU scheduler may be able to schedule computing units by priority. However, such a DirectX® GPU scheduler may only be able to handle GPUs, and may not be able to handle other processing engines. Additionally, parallel computing solution like Open Source Computer Vision (OpenCV), NVIDIA's parallel computing architecture Compute Unified Device Architecture (CUDA), and/or C for Media may only allow one kernel to be computed at either the CPU or the GPU, not both. Accordingly, there currently may be no meaningful runtime dispatching to heterogeneous processing engines.

As will be described in greater detail below, operations for runtime dispatching among a heterogeneous group of processors may include introduces a component called a scheduler. Such a scheduler may offer the ability to dispatching tasks to heterogeneous processing engines at run time. Such run time dispatching may be selectively adjusted at run time based on certain criteria, such as power conservation, thermal balancing, speed optimization, the like, and/or combinations thereof. Such run time dispatching could provide an improved user experience based on actual run time usage models and/or actual run time conditions, instead of predictions made at design time.

It could be a significant capability to have better performance and user experience in speed, power consumption, and/or thermal balance with no additional hardware cost. Runtime dispatching could allow both faster processing for time critical applications and longer battery life with same hardware configuration. Such a capability may be important for users of tablets, laptops, mobile Internet devices (MID), smartphones, and/or the like. Also, the ability to reduce overall power consumption could help to contribute to environmental conservation.

FIG. 1 is an illustrative diagram of an example runtime dispatching system 100, arranged in accordance with at least some implementations of the present disclosure. In the illustrated implementation, runtime dispatching system 100 may include active application 110, one or more logic modules (e.g., scheduler module 130 and/or dispatch module 140), and/or one or more processors (e.g. heterogeneous group of processors CPU 142, GPU 144, GPU 146, and/or the like). In the illustrated example, heterogeneous group of processors 142/144/146 may include CPU 142, GPU 144, and/or GPU 146; however, heterogeneous group of processors 142/144/146 may include two or more processors that are not all homogeneous in nature. As used herein the term "heterogeneous group of processors" may refer to there being two or more types of processors (e.g., CPU, GPU, etc.) and/or may refer to there being varying performance characteristics among the processors (e.g., first GPU 144 with a first processing speed and second GPU 146 with a different processing speed, or the like).

In some examples, runtime dispatching system 100 may include additional items that have not been shown in FIG. 1 for the sake of clarity. For example, runtime dispatching system 100 may include a display, an imaging device, a video coder, a radio frequency-type (RF) transceiver, and/or an antenna. Further, runtime dispatching system 100 may include additional items such as a speaker, a microphone, an accelerometer, memory, a router, network interface logic, etc. that have not been shown in FIG. 1 for the sake of clarity.

In some examples, active application 110 may be configured to load computing unit source code 120, where computing unit source code 120 may include an individual computing unit selected from a plurality of computing units (e.g., unit A 112, unit B 114, unit C 116, etc.) that make up active application 110. As used herein, the term "source code" may refer to a human-readable computer language, an intermediate language (such as, for example, java byte code), or the like. Active application 110 may be configured to create a thread context array based at least in part on the computing unit source code 120, where the thread context array includes the first and second context (e.g., context B1 122, context B2 124, and/or context B3 126, etc.). Active application 110 may be configured to initiate a request for scheduling to scheduler module 130, where the request for scheduling may include the computing unit source code 120 as well as the first and second context data (e.g., context B1 122, context B2 124, and/or context B3 126, etc.) associated with computing unit source code 120.

In some examples, scheduler module 130 may be communicatively coupled to heterogeneous group of processors 142/144/146. Scheduler module 130 may be configured to transfer a computing unit source code 120 as well as first and second context data (e.g., context B1 122, context B2 124, and/or context B3 126, etc.) associated with the computing unit source code 120 from active application 110. For example a plurality of computing units (e.g., unit A 112, unit B 114, unit C 116, etc.) configurable for individual execution may include all or portions of active application 110. Accordingly, scheduler module 130 may operate in an environment where application developers have already split computing tasks into small computing units 112/114/116, as may be done in Open Source Computer Vision (OpenCV), NVIDIA's parallel computing architecture Compute Unified Device Architecture (CUDA), and/or C for Media. Scheduler module 130 may be configured to determine a distribution of the computing unit source code 120 to heterogeneous group of processors 142/144/146. For example, heterogeneous group of processors 142/144/146 may include a first processor 142 and a second processor 146, or more (e.g., GPU 144 or the like), where the second processor 146 is of a different type than the first processor 142.

In some examples, scheduler module 130 may be configured to compile a first binary version (e.g., binary B1 132) and a second binary version (e.g., binary B2 134), or more (e.g., binary B3 136, etc.), of the computing unit source code. For example, first binary version 132 of the computing unit source code 120 may be compatible with first processor 142 and second binary version 134 of the computing unit source code 120 may be compatible with second processor 146.

In some examples, scheduler module 130 may be configured to transfer thermal data associated with the computer. For example, scheduler module 130 may be configured to determine a thermal level based at least in part on the thermal data. As used herein the term "transfer" may generically refer to communications involving passively receiving data, receiving data in response to an active request, or sending such data, such as communications that may involve push-type communications, pull-type communications or push & pull-type communications.

Additionally or alternatively, scheduler module 130 may be configured to transfer power supply data associated with the computer. For example, scheduler module 130 may be configured to determine a current power source and/or a battery charge level based at least in part on the power supply data.

Additionally or alternatively, scheduler module 130 may be configured to transfer load data from heterogeneous group of processors 142/144/146, where the load data indicates available load for individual processors. Scheduler module 130 may be configured to detect individual processors of heterogeneous group of processors 142/144/146 based at least in part on the load data.

In some examples, scheduler module 130 may be configured to transfer first binary version 132 of the computing unit source code 120 and the first context data 122 to first processor 142 and second binary version 134 and/or 136 of the computing unit source code 120 and second context data 124 and/or 126 to second processor 146. For example, the determination of the distribution of computing unit source code 120 to heterogeneous group of processors 142/144/146 may be based at least in part on one or more of the load data, the determination of the thermal level, the determination of the current power source and/or a battery charge level, the like, and/or combinations thereof.

In some examples, runtime dispatching system 100 may further include dispatch module 140 (e.g., dispatch module 140 may be launchable from scheduler module 130). For example, dispatch module 140 may be associated with scheduler module 130 and may be configured to determine when one of the first processor and/or second processors of heterogeneous group of processors 142/144/146 become available based at least in part on load data from heterogeneous group of processors 142/144/146, where the load data indicates available load for individual processors. The transferring of the first binary version 132 of the computing unit source code 120 and the first context data 122 to the first processor 142 and the second binary version 134 and/or 136 of computing unit source code 120 and second context data 124 and/or 126 to second processor 146 may be performed via dispatch module 140 in response to first processor 142 and/or second processors 146 becoming available.

In operation, runtime dispatching system 100 may utilize scheduler module 130 to dispatch computing units and contexts to heterogeneous group of processors 142/144/146 at run time instead of design time. For example, such operations may offer the possibility to load heterogeneous group of processors 142/144/146 based on a speed optimization algorithm in cases where the computer is using AC power. Similarly, in cases where the computer is using battery power, runtime dispatching system 100 may utilize scheduler module 130 to load heterogeneous group of processors 142/144/146 based on a power optimized algorithm. Likewise, in cases where the computer is thermally sensitive, runtime dispatching system 100 may utilize scheduler module 130 to load heterogeneous group of processors 142/144/146 based on a thermal balancing algorithm. Accordingly, runtime dispatching system 100 may utilize any combination of such a speed optimization algorithm, power optimized algorithm, thermal balancing algorithm, and/or the like during the determination of the distribution of computing unit source code 120 to heterogeneous group of processors 142/144/146. Accordingly, runtime dispatching system 100 may allow for dispatching of computing tasks among heterogeneous processing engines at runtime instead of design time thru cooperation among active application 110, scheduler module 130, and heterogeneous group of processors 142/144/146.

As will be discussed in greater detail below, runtime dispatching system 100 may be used to perform some or all of the various functions discussed below in connection with FIGS. 2 and/or 3.

Figure 2:
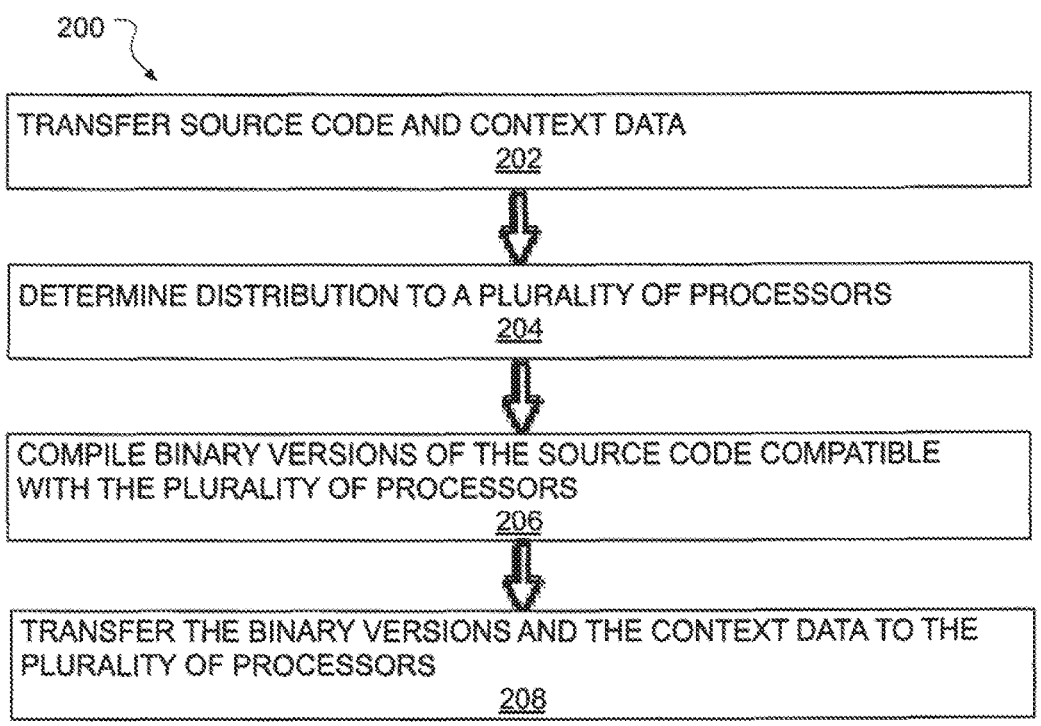
FIG. 2 is a flow chart illustrating an example runtime dispatching process.

FIG. 2 is a flow chart illustrating an example runtime dispatching process 200, arranged in accordance with at least some implementations of the present disclosure. In the illustrated implementation, process 200 may include one or more operations, functions or actions as illustrated by one or more of blocks 202, 204, 206, and/or 208. By way of non-limiting example, process 200 will be described herein with reference to example runtime dispatching system 100 of FIGS. 1 and/or 4.

Process 200 may operate as a computer-implemented method for runtime dispatching among a heterogeneous group of processors of a computer. Process 200 may begin at block 202, "TRANSFER SOURCE CODE AND CONTEXT DATA", where source code and context data may be transferred. For example, a computing unit source code as well as first and second context data associated with the computing unit source code from an active application may be transferred, via a scheduler module. In some examples, a plurality of computing units configurable for individual execution may make up the active application.

As used herein the term "transfer" may generically refer to communications involving passively receiving data, receiving data in response to an active request, or sending such data, such as communications that may involve push-type communications, pull-type communications or push & pull-type communications.

Processing may continue from operation 202 to operation 204, "DETERMINE DISTRIBUTION TO A PLURALITY OF PROCESSORS", where a distribution to a plurality of processors may be determined. For example, a scheduler module may determine a distribution of the computing unit source code to the heterogeneous group of processors. In some examples, the heterogeneous group of processors may include a first processor and a second processor, where the second processor may be of a different type than the first processor.

Processing may continue from operation 204 to operation 206, "COMPILE BINARY VERSIONS OF THE SOURCE CODE COMPATIBLE WITH THE PLURALITY OF PROCESSORS", where binary versions of the source code compatible with the plurality of processors may be compiled. For example, the scheduler module may compile a first binary version and a second binary version of the computing unit source code. In some examples, the first binary version of the computing unit source code may be compatible with the first processor and the second binary version of the computing unit source code may be compatible with the second processor.

Processing may continue from operation 206 to operation 208, "TRANSFER THE BINARY VERSIONS AND THE CONTEXT DATA TO THE PLURALITY OF PROCESSORS", where the binary versions and the context data may be transferred to the plurality of processors. For example, the scheduler module may transfer the first binary version of the computing unit source code and the first context data to the first processor and the second binary version of the computing unit source code and may transfer the second context data to the second processor.

In operation, process 200 may utilize smart and context aware responses to power supply data, thermal data, and/or load data. For example, process 200 may be capable selectively adjusting runtime dispatching based on the distribution determined at operation 204.

Some additional and/or alternative details related to process 200 may be illustrated in one or more examples of implementations discussed in greater detail below with regard to FIG. 3.

Figure 3:
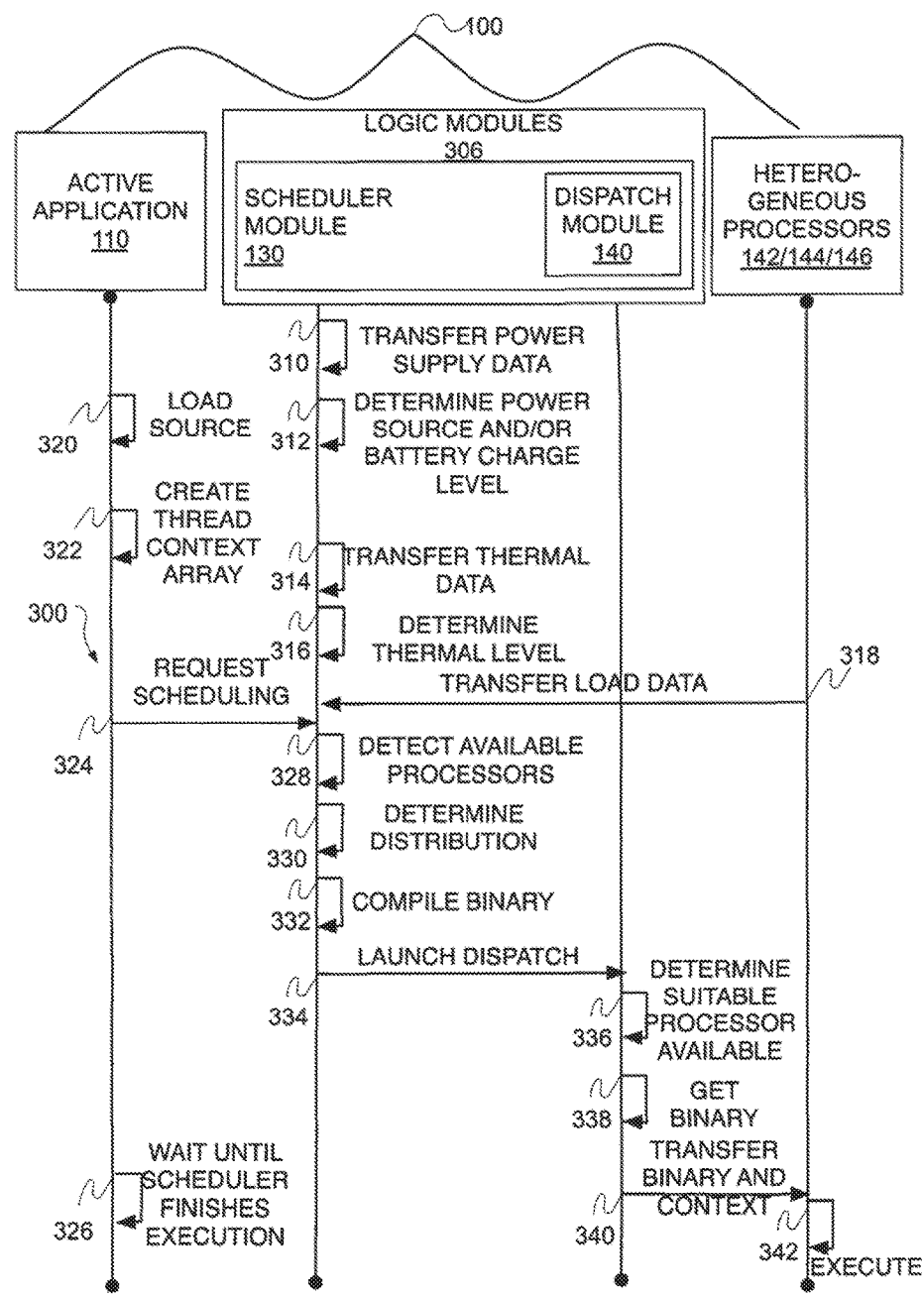
FIG. 3 is an illustrative diagram of an example runtime dispatching system in operation.

FIG. 3 is an illustrative diagram of example runtime dispatching system 100 and runtime dispatching process 300 in operation, arranged in accordance with at least some implementations of the present disclosure. In the illustrated implementation, process 300 may include one or more operations, functions or actions as illustrated by one or more of actions 310, 312, 314, 316, 318, 320, 322, 324, 326, 328, 330, 332, 334, 336, 338, 340 and/or 342. By way of non-limiting example, process 300 will be described herein with reference to example runtime dispatching system 100 of FIGS. 1 and/or 4.

In the illustrated implementation, runtime dispatching system 100 may include active application 110, heterogeneous processors 142/144/146, logic modules 306, the like, and/or combinations thereof. Although runtime dispatching system 100, as shown in FIG. 3, may include one particular set of blocks or actions associated with particular modules, these blocks or actions may be associated with different modules than the particular module illustrated here.

Processing may begin at operation 310, "TRANSFER POWER SUPPLY DATA", where power supply data may be transferred. For example, scheduler module 130 may transfer power supply data associated with the computer.

In some examples, the power supply data may include an indication of a current power source and/or an indication of battery charge level. The indication of the current power source may indicate whether the current power source is a battery-type power source or an external power source. For example, capturing of power supply data may be performed in conjunction with a power supply (not shown, such as a battery or the like). The power supply data may include an indication of a current power source and/or an indication of battery charge level.

Processing may continue from operation 310 to operation 312, "DETERMINE POWER SOURCE AND/OR BATTERY CHARGE LEVEL", where power source and/or battery charge level may be determined. For example, scheduler module 130 may determine a current power source and/or a battery charge level based at least in part on the power supply data.

For example, the power supply data may supply an indication of the current power source (e.g., the power supply data may indicate whether the current power source is a battery-type power source or an external power source). Additionally, the power supply data may supply an indication of the battery charge level.

Processing may continue from operation 312 to operation 314, "TRANSFER THERMAL DATA", where thermal data associated with the computer may be transferred. For example, scheduler module 130 may transfer thermal data associated with the computer.

Processing may continue from operation 314 to operation 316, "DETERMINE THERMAL LEVEL", where a thermal level may be determined. For example, scheduler module 130 may determine a thermal level based at least in part on the thermal data.

Processing may continue from operation 316 to operation 318, "TRANSFER LOAD DATA", where load data may be transferred. For example, scheduler module 130 may transfer load data from heterogeneous group of processors 142/144/146, where the load data may indicate an available load for individual processors of heterogeneous group of processors 142/144/146.

While process 300 is illustrated as beginning at operations 310, 312, 314, 316, and 318, some or all of operations 310, 312, 314, 316, and/or 318 may occur at any point prior to operation 330, which will be discussed in greater detail below.

Processing may continue from operation 318 to operation 320, "LOAD SOURCE", where a source may be loaded. For example, the computing unit source code may be loaded, via active application 110. In some examples the computing unit source code may include an individual computing unit selected from a plurality of computing units that make up the active application.

Processing may continue from operation 320 to operation 322, "CREATE THREAD CONTEXT ARRAY", where a thread context array may be created. For example, active application 100 may create a thread context array based at least in part on the computing unit source code, where the thread context array may include the first and second context.

Processing may continue from operation 322 to operation 324, "REQUEST SCHEDULING", where a request for scheduling may be initiated. For example, active application 110 may initiate a request for scheduling to scheduler module 130. While process 300 is illustrated as beginning at operations 310, 312, 314, 316, and 318, some or all of operations 310, 312, 314, 316, and/or 318, may occur at any point before or after operation 324 and at any point prior to operation 330.

In some examples, the request for scheduling may include the computing unit source code as well as the first and second context data associated with the computing unit source code. For example, such a request for scheduling may include and/or trigger a transfer of source code and context data. In such an example, a computing unit source code as well as first and second context data associated with the computing unit source code from an active application may be transferred to scheduler module 130. In some examples, a plurality of computing units configurable for individual execution may make up the active application.

Processing may continue from operation 324 to operation 326, "WAIT UNTIL SCHEDULER FINISHES EXECUTION", where active application 110 may wait until scheduler module 130 finishes execution. For example, active application 110 may wait until scheduler module 130 finishes facilitating execution, as will be described in greater detail below regarding operation 342, to continue operation.

While process 300 is illustrated as proceeding from operation 324 to operations 328, operations 310, 312, 314, 316, and/or 318 may occur at any point before or after operation 328 and at any point prior to operation 330, which will be discussed in greater detail below.

Processing may continue from operations 318 and/or 324 to operation 328, "DETECT AVAILABLE PROCESSORS", where available processors may be detected. For example, scheduler module 130 may detect individual processors of heterogeneous group of processors 142/144/146 based at least in part on the load data. While process 300 is illustrated as beginning at operations 310, 312, 314, 316, and 318, some or all of operations 310, 312, 314, 316, and/or 318, may occur at any point before or after operation 328 and at any point prior to operation 330.

Processing may continue from operation 328 to operation 330, "DETERMINE DISTRIBUTION", where a distribution to a plurality of processors may be determined. For example, scheduler module 130 may determine a distribution of the computing unit source code to the heterogeneous group of processors. In some examples, heterogeneous group of processors 142/144/146 may include a first processor and a second processor, where the second processor may be of a different type than the first processor.

In operation, such a determination of the distribution of the computing unit source code to heterogeneous group of processors 142/144/146 may be based at least in part on the load data, the determination of the thermal level, the determination of the current power source and/or a battery charge level, the like, and/or combinations thereof. Accordingly, runtime dispatching system 100 may be capable of selectively adjusting runtime dispatching to the basic runtime dispatching in response to load data, thermal level, current power source and/or a battery charge level, or the like.

Processing may continue from operation 330 to operation 332, "COMPILE BINARY", where binary versions of the source code compatible with the plurality of processors may be compiled. For example, scheduler module 130 may compile a first binary version and a second binary version of the computing unit source code. In some examples, the first binary version of the computing unit source code may be compatible with the first processor and the second binary version of the computing unit source code may be compatible with the second processor.

Processing may continue from operation 332 to operation 334, "LAUNCH DISPATCH", where a dispatch module 140 may be launched. For example, dispatch module 140 may be launched via scheduler module 130. In some examples, the launching of dispatch module 130 may be triggered by scheduler module 130 completing the binary compilation.

Processing may continue from operation 334 to operation 336, "DETERMINE SUITABLE PROCESSOR AVAILABLE", where a determination may be made regarding the availability of suitable processors. For example, dispatch module 140 may determine when one of the first processor and/or second processors become available based at least in part on load data from heterogeneous group of processors 142/144/146, where the load data may indicate available load for individual processors.

Processing may continue from operation 336 to operation 338, "GET BINARY", where binary versions maybe acquired. For example, the transferring of the first binary version of the computing unit source code and the first context data to the first processor and the second binary version of the computing unit source code and the second context data to the second processor may be performed via dispatch module 140 in response to the first processor and/or second processors becoming available.

Processing may continue from operation 338 to operation 340, "TRANSFER BINARY AND CONTEXT", where the binary versions and the context data may be transferred to the plurality of processors 142/144/146. For example, dispatch module 140 (which may associated with scheduler module 130) may transfer the first binary version of the computing unit source code and the first context data to the first processor and the second binary version of the computing unit source code and may transfer the second context data to the second processor.

Processing may continue from operation 340 to operation 342, "EXECUTE", where the binary versions may be executed. For example, the first binary version of the computing unit source code may be executed via the first processor consistent with the first context data and the second binary version of the computing unit source code may be executed via the second processor consistent with the second context data.

In operation, process 300 may utilize smart and context aware responses to power supply data, thermal data, and/or load data. For example, process 300 may be capable selectively adjusting runtime dispatching based on the distribution determined at operation 330. For example, as discussed above, computing tasks may have been previously designated to be split (e.g. by an application developer as design time) into small computing units in active application 110. These computing units could be compiled at design time or compiled just-in-time by scheduler module 130 to a platform dependent binary. Active application 110 may passe these computing units and related contexts to scheduler module 130 by calling scheduler module 130 application programming interface (API).

In some examples, scheduler module 130 may dispatch computing units and related contexts to heterogeneous group of processors 142/144/146 based on one or more dispatching algorithms. Such dispatching algorithms could be a single algorithm or a combination of different algorithms to prioritize speed, power consumption, thermal balance, the like, or just simple filling processors that are not currently being utilize or have a lower load. Communications between scheduler module 130 and heterogeneous group of processors 142/144/146 may be push, pull or push and pull-type communications.

In some examples, scheduler module 130 may have a standalone thread or process called dispatch module 140, to perform dispatching activities. Scheduler module 130 could induce some system overhead caused by dispatch module 140 and just-in-time (JIT) compilation. Such JIT compilation overhead could be minimized thru use of a JIT binary cache and/or other JIT optimization method. Dispatch module 140 overhead may be relatively small, comparable to process switching overhead from an operation system. Dispatch module 140 may be optimized when integrated the operating system (OS) kernel. Such overhead could be made up for by through performance gained via other portions of process 300.

While implementation of example processes 200 and 300, as illustrated in FIGS. 2 and 3, may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 2 and 3 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 2 and 3 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 4:
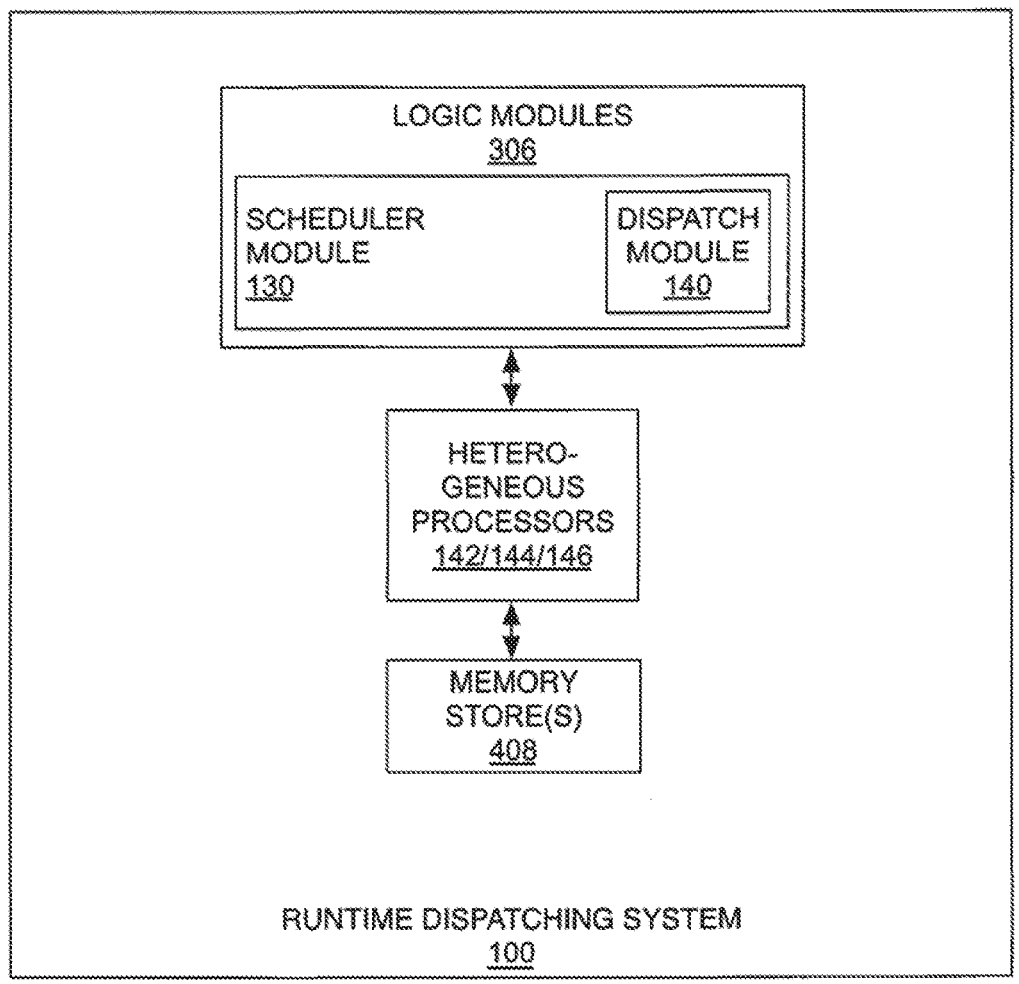
FIG. 4 is an illustrative diagram of an example runtime dispatching system.

FIG. 4 is an illustrative diagram of an example runtime dispatching system 100, arranged in accordance with at least some implementations of the present disclosure. In the illustrated implementation, runtime dispatching system 100 may include logic modules 306, one or more processors (e.g. heterogeneous group of processors 142/144/146), and/or one or more memory stores 408. Logic modules 306 may include scheduler module 130, dispatch module 140 (e.g., dispatch module 140 may comprise a portion of scheduler module 130 or may be separate from scheduler module 130), the like, and/or combinations thereof. As illustrated, heterogeneous group of processors 142/144/146 and/or memory stores 408 may be capable of communication with one another and/or communication with portions of logic modules 306. Although runtime dispatching system 100, as shown in FIG. 4, may include one particular set of blocks or actions associated with particular modules, these blocks or actions may be associated with different modules than the particular module illustrated here.

In some examples, one or more memory stores 408 may be communicatively coupled to heterogeneous group of processors 142/144/146. Logic modules 306 may be communicatively coupled to heterogeneous group of processors 142/144/146 and/or memory stores 408.

In some examples, scheduler module 130 may be communicatively coupled to heterogeneous group of processors 142/144/146 and the one or more memory stores 408. Scheduler module 130 may be configured to transfer a computing unit source code as well as first and second context data associated with the computing unit source code from an active application. For example a plurality of computing units configurable for individual execution may include the active application. Scheduler module 130 may be configured to determine a distribution of the computing unit source code to heterogeneous group of processors 142/144/146. For example, heterogeneous group of processors 142/144/146 may include a first processor and a second processor, where the second processor is of a different type than the first processor.

In some examples, scheduler module 130 may be configured to compile a first binary version and a second binary version of the computing unit source code. For example, the first binary version of the computing unit source code may be compatible with the first processor and the second binary version of the computing unit source code may be compatible with the second processor.

In some examples, scheduler module 130 may be configured to transfer the first binary version of the computing unit source code and the first context data to the first processor and the second binary version of the computing unit source code and the second context data to the second processor.

In some examples, an active application may be configured to load the computing unit source code, where the computing unit source code includes an individual computing unit selected from a plurality of computing units that make up the active application. The active application may be configured to create a thread context array based at least in part on the computing unit source code, where the thread context array includes the first and second context. The active application may be configured to initiate a request for scheduling to scheduler module 130, where the request for scheduling may include the computing unit source code as well as the first and second context data associated with the computing unit source code.

In some examples, scheduler module 130 may be configured to transfer thermal data associated with the computer. For example, scheduler module 130 may be configured to determine a thermal level based at least in part on the thermal data.

Additionally or alternatively, scheduler module 130 may be configured to transfer power supply data associated with the computer. For example, scheduler module 130 may be configured to determine a current power source and/or a battery charge level based at least in part on the power supply data.

Additionally or alternatively, scheduler module 130 may be configured to transfer load data from heterogeneous group of processors 142/144/146, where the load data indicates available load for individual processors. Scheduler module 130 may be configured to detect individual processors of heterogeneous group of processors 142/144/146 based at least in part on the load data.

In some examples, the determination of the distribution of the computing unit source code to heterogeneous group of processors 142/144/146 may be based at least in part on one or more of the load data, the determination of the thermal level, the determination of the current power source and/or a battery charge level, the like, and/or combinations thereof.

In some examples, runtime dispatching system 100 may further include dispatch module 140 (e.g., dispatch module 140 may be launchable from scheduler module 130). For example, dispatch module 140 may be associated with scheduler module 130 and may be configured to determine when one of the first processor and/or second processors become available based at least in part on load data from heterogeneous group of processors 142/144/146, where the load data indicates available load for individual processors. The transferring of the first binary version of the computing unit source code and the first context data to the first processor and the second binary version of the computing unit source code and the second context data to the second processor may be performed via dispatch module 140 in response to the first processor and/or second processors becoming available.

In various embodiments, scheduler module 130 may be implemented in hardware, while software may implement dispatch module 140. For example, in some embodiments, scheduler module 130 may be implemented by ASIC logic while dispatch module 140 may be provided by software instructions executed by logic such as processors 142/144/146 However, the present disclosure is not limited in this regard and scheduler module 130 and/or dispatch module 140 may be implemented by any combination of hardware, firmware and/or software. In addition, memory stores 408 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 408 may be implemented by cache memory.

Figure 5:
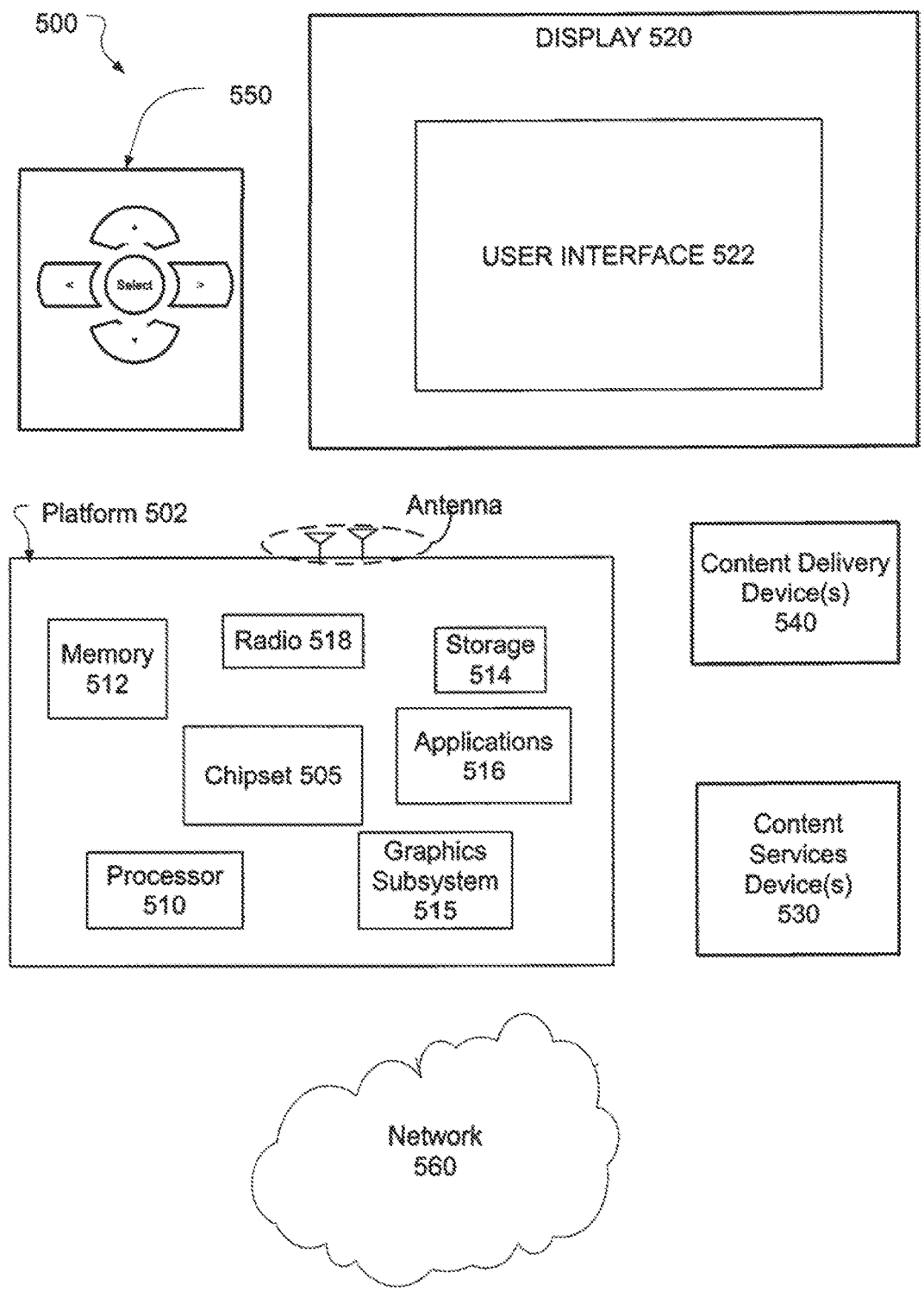
FIG. 5 is an illustrative diagram of an example system.

FIG. 5 illustrates an example system 500 in accordance with the present disclosure. In various implementations, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 500 includes a platform 502 coupled to a display 520. Platform 502 may receive content from a content device such as content services device(s) 530 or content delivery device(s) 540 or other similar content sources. A navigation controller 550 including one or more navigation features may be used to interact with, for example, platform 502 and/or display 520. Each of these components is described in greater detail below.

In various implementations, platform 502 may include any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 510 may be dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 514 may include technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 may be integrated into processor 510 or chipset 505. In some implementations, graphics subsystem 515 may be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, display 520 may include any television type monitor or display. Display 520 may include, for example, a computer display screen, touch screen display, video monitor, television-like device, and/or a television. Display 520 may be digital and/or analog. In various implementations, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In various implementations, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In various implementations, content services device(s) 530 may include a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but may be integrated into platform 502 and/or display 520. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 even when the platform is turned "off." In addition, chipset 505 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
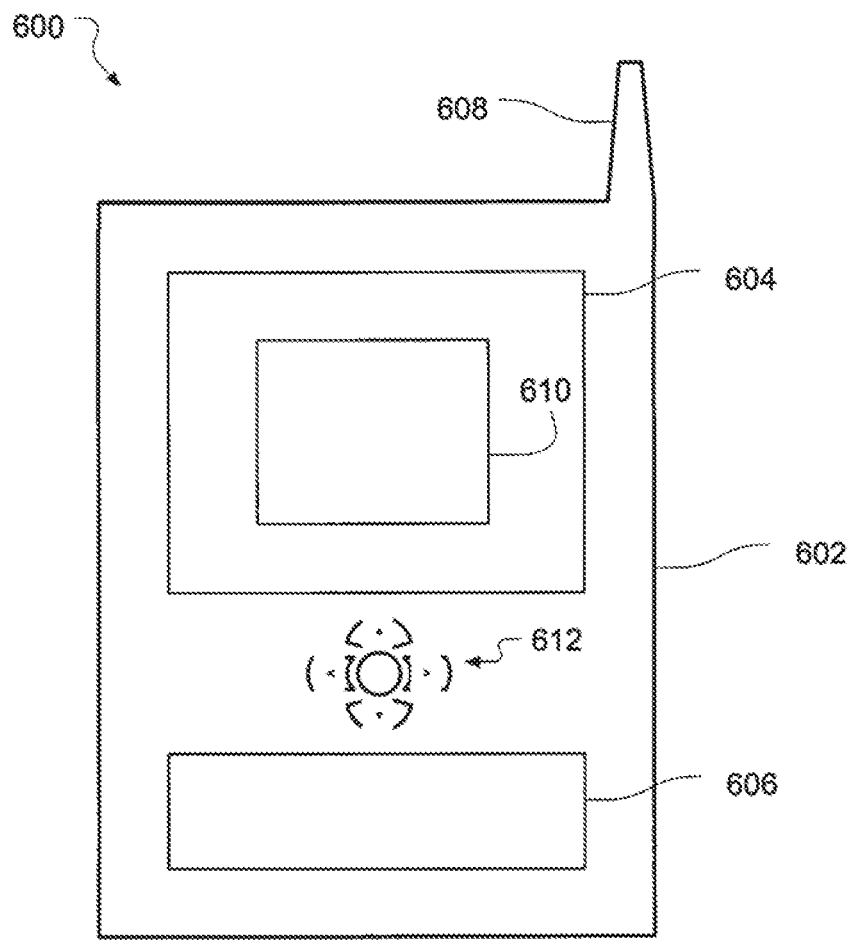
FIG. 6 is an illustrative diagram of an example system, all arranged in accordance with at least some implementations of the present disclosure.

As described above, system 500 may be embodied in varying physical styles or form factors. FIG. 6 illustrates implementations of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a housing 602, a display 604, an input/output (I/O) device 606, and an antenna 608. Device 600 also may include navigation features 612. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for runtime dispatching among a heterogeneous group of processors of a computer may include transferring, via a scheduler module, a computing unit source code as well as first and second context data associated with the computing unit source code from an active application. A plurality of computing units configurable for individual execution may make up the active application. The scheduler module may determine a distribution of the computing unit source code to the heterogeneous group of processors. The heterogeneous group of processors may include a first processor and a second processor, where the second processor may be of a different type than the first processor. The scheduler module may compile a first binary version and a second binary version of the computing unit source code, where the first binary version of the computing unit source code may be compatible with the first processor and the second binary version of the computing unit source code may be compatible with the second processor. The scheduler module may transfer the first binary version of the computing unit source code and the first context data to the first processor and the second binary version of the computing unit source code and the second context data to the second processor.

In some examples, the method may include loading, via the active application, the computing unit source code, where the computing unit source code includes an individual computing unit selected from a plurality of computing units that make up the active application. The active application may create a thread context array based at least in part on the computing unit source code, where the thread context array includes the first and second context. The active application may initiate a request for scheduling to the scheduler module, where the request for scheduling includes the computing unit source code as well as the first and second context data associated with the computing unit source code. The scheduler module may transfer thermal data associated with the computer. The scheduler module may determine a thermal level based at least in part on the thermal data. The scheduler module may transfer power supply data associated with the computer. The scheduler module may determine a current power source and/or a battery charge level based at least in part on the power supply data. The scheduler module may transfer load data from the heterogeneous group of processors, where the load data indicates available load for individual processors. The scheduler module may detect individual processors of the heterogeneous group of processors based at least in part on the load data. The determination of the distribution of the computing unit source code to the heterogeneous group of processors may be based at least in part on the load data, the determination of the thermal level, and the determination of the current power source and/or a battery charge level, the like, and/or combinations thereof. The transferring of the first binary version of the computing unit source code and the first context data to the first processor and the second binary version of the computing unit source code and the second context data to the second processor may include launching, via the scheduler module, a dispatch module associated with the scheduler module. The dispatch module may determine when one of the first processor and/or second processors become available based at least in part on load data from the heterogeneous group of processors, where the load data indicates available load for individual processors. The transferring of the first binary version of the computing unit source code and the first context data to the first processor and the second binary version of the computing unit source code and the second context data to the second processor may be performed via the dispatch module in response to the first processor and/or second processors becoming available.

In other examples, a system for runtime dispatching for a computer may include a heterogeneous group of processors, one or more memory stores, a scheduler module, the like, and/or combinations thereof. The one or more memory stores may be communicatively coupled to the heterogeneous group of processors. The scheduler module may be communicatively coupled to the heterogeneous group of processors and the one or more memory stores and configured to transfer a computing unit source code as well as first and second context data associated with the computing unit source code from an active application, where a plurality of computing units configurable for individual execution include the active application. The scheduler module may be configured to determine a distribution of the computing unit source code to the heterogeneous group of processors including a first processor and a second processor, where the second processor is of a different type than the first processor. The scheduler module may be configured to compile a first binary version and a second binary version of the computing unit source code, where the first binary version of the computing unit source code is compatible with the first processor and the second binary version of the computing unit source code is compatible with the second processor. The scheduler module may be configured to transfer the first binary version of the computing unit source code and the first context data to the first processor and the second binary version of the computing unit source code and the second context data to the second processor.

In some examples, the active application may be configured to load the computing unit source code, where the computing unit source code includes an individual computing unit selected from a plurality of computing units that make up the active application. The active application may be configured to create a thread context array based at least in part on the computing unit source code, where the thread context array includes the first and second context. The active application may be configured to initiate a request for scheduling to the scheduler module, where the request for scheduling includes the computing unit source code as well as the first and second context data associated with the computing unit source code. The scheduler module may be configured to transfer thermal data associated with the computer. The scheduler module may be configured to determine a thermal level based at least in part on the thermal data. The scheduler module may be configured to transfer power supply data associated with the computer. The scheduler module may be configured to determine a current power source and/or a battery charge level based at least in part on the power supply data. The scheduler module may be configured to transfer load data from the heterogeneous group of processors, where the load data indicates available load for individual processors. The scheduler module may be configured to detect individual processors of the heterogeneous group of processors based at least in part on the load data. The determination of the distribution of the computing unit source code to the heterogeneous group of processors is based at least in part on one or more of the load data, the determination of the thermal level, and the determination of the current power source and/or a battery charge level. The system may further include a dispatch module launchable from the scheduler module. The dispatch module may be associated with the scheduler module and may be configured to determine when one of the first processor and/or second processors become available based at least in part on load data from the heterogeneous group of processors, where the load data indicates available load for individual processors. The transferring of the first binary version of the computing unit source code and the first context data to the first processor and the second binary version of the computing unit source code and the second context data to the second processor is performed via the dispatch module in response to the first processor and/or second processors becoming available.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method comprising:
    initiating, by a processing device, a request for scheduling processing of a plurality of computing units and context data associated with the active application, wherein the request for scheduling is provided to a scheduler module and comprises computing unit source code and context data associated with the source code, wherein the context data is part of data that is transferred from a memory of one or more memory stores to a heterogenous group of processes, wherein the data includes the source code associated with an active application;
    obtaining, by the scheduler module, thermal data or power supply data associated with a computing device; and
    determining, by the scheduler module, the distribution of the computing unit source code and context data to the heterogenous group of processors depending on one or more of the thermal data and the power supply data, wherein the heterogeneous group of processors comprises at least a first processor and a second processor, wherein the second processor is of a different type than the first processor,
    wherein a first binary version and a second binary version of the computing unit source code and the context data are provided to the first processor and the second processor, respectively, such that the computing unit source code and the context data from a single computing unit is distributed to the first and second processors of different types, wherein the first binary version and the second binary version of the computing unit source code are compiled just-in-time, wherein the first binary version of the computing unit source code is compatible with the first processor and the second binary version of the computing unit source code is compatible with the second processor, wherein overhead associated with the just-in-time compilation is reduced using a just-in-time binary cache.

2. The method of claim 1 wherein the scheduler module has the at least one of thermal and power supply data transferred to the scheduler module in response to a request for scheduling by the active application.

3. The method of claim 1, further comprising:
    providing, to the scheduler module, load data from the heterogenous group of processors, wherein the load data indicates available load for individual processors; and
    detecting, via the scheduler module, individual processors of the heterogenous group of processors based at least in part on the load data.

4. The method of claim 1, further comprising:
    providing, to the scheduler module, load data from the heterogenous group of processors, wherein the load data indicates available load for individual processors; and
    wherein the determination of the distribution of the computing unit source code to the heterogenous group of processors is based at least in part on the load data.

5. The method of claim 1, further comprising:
    providing, to the scheduler module, thermal data associated with the computer;
    determining, via the scheduler module, a thermal level based at least in part on the thermal data; and
    wherein the determination of the distribution of the computing unit source code to the heterogenous group of processors is based at least in part on the determination of the thermal level.

6. The method of claim 1, further comprising:
    providing, to the scheduler module, power supply data associated with the computing device;
    determining, via the scheduler module, a current power source and/or a battery charge level based at least in part on the power supply data; and
    wherein the determination of the distribution of the computing unit source code to the heterogenous group of processors is based at least in part on the determination of the current power source and/or a battery charge level.

7. The method of claim 1 further comprising:
compiling, via the scheduler module, the first binary version and the second binary version of the computing unit source code, wherein the first binary version of the computing unit source code is compatible with the first processor and the second binary version of the computing unit source code is compatible with the second processor.

8. The method of claim 7, comprising:
launching, via the scheduler module, a dispatch module associated with the scheduler module;
determining, via the dispatch module, when one of the first processor and/or second processors become available based at least in part on load data from the heterogenous group of processors, wherein the load data indicates available load for individual processors; and
providing the first binary version of the computing unit source code and the first context data to the first processor and the second binary version of the computing unit source code and the second context data to the second processor via the dispatch module in response to the first processor and/or second processors becoming available.

9. The method of claim 1, wherein the heterogenous group of processors comprises at least a first processor and a second processor, wherein the second processor is of a different type than the first processor, and the method comprising:
loading, via the active application, the computing unit source code, wherein the computing unit source code comprises an individual computing unit selected from the plurality of computing units that comprise the active application;
creating, via the active application, a thread context array based at least in part on the computing unit source code, wherein the thread context array comprises the first and second context;
providing, to the scheduler module, thermal data associated with the computing device;
determining, via the scheduler module, a thermal level based at least in part on the thermal data;
providing, to the scheduler module, power supply data associated with the computing device;
determining, via the scheduler module, a current power source and/or a battery charge level based at least in part on the power supply data;
providing, to the scheduler module, load data from the heterogenous group of processors, wherein the load data indicates available load for individual processors;
detecting, via the scheduler module, individual processors of the heterogenous group of processors based at least in part on the load data;
wherein the determination of the distribution of the computing unit source code to the heterogenous group of processors is based at least in part on one or more of the load data, the determination of the thermal level, and the determination of the current power source and/or a battery charge level,
wherein the providing of the first binary version of the computing unit source code and the first context data to the first processor and the second binary version of the computing unit source code and the second context data to the second processor comprises:
launching, via the scheduler module, a dispatch module associated with the scheduler module;
determining, via the dispatch module, when one of the first processor and/or second processors become available based at least in part on load data from the heterogenous group of processors, wherein the load data indicates available load for individual processors; and
providing the first binary version of the computing unit source code and the first context data to the first processor and the second binary version of the computing unit source code and the second context data to the second processor via the dispatch module in response to the first processor and/or second processors becoming available.

10. At least one machine-readable medium comprising a plurality of instructions that in response to being executed on a computing device, cause the computing device to perform operations comprising:
initiating a request for scheduling processing of a plurality of computing units and context data associated with the active application, wherein the request for scheduling is provided to a scheduler module and comprises computing unit source code and context data associated with the source code, wherein the context data is part of data that is transferred from a memory of one or more memory stores to a heterogenous group of processes, wherein the data includes the source code associated with an active application;
obtaining, by the scheduler module, thermal data or power supply data associated with a computing device; and
determining, by the scheduler module, the distribution of the computing unit source code and context data to the heterogenous group of processors depending on one or more of thermal data and the power supply data, wherein the heterogenous group of processors comprises at least a first processor and a second processor, wherein the second processor is of a different type than the first processor, wherein a first binary version and a second binary version of the computing unit source code and the context data are provided to the first processor and the second processor, respectively, such that the computing unit source code and the context data from a single computing unit is distributed to the first and second processors of different types, wherein the first binary version and the second binary version of the computing unit source code are compiled just-in-time, wherein the first binary version of the computing unit source code is compatible with the first processor and the second binary version of the computing unit source code is compatible with the second processor, wherein overhead associated with the just-in-time compilation is reduced using a just-in-time binary cache.

11. The machine-readable medium of claim 10, wherein the medium comprising instructions that in response to being executed on the computing device, cause the computing device to operate by:
compiling, via the scheduler module, the first binary version and the second binary version of the computing unit source code, wherein the first binary version of the computing unit source code is compatible with the first processor and the second binary version of the computing unit source code is compatible with the second processor;
loading, via the active application, the computing unit source code, wherein the computing unit source code comprises an individual computing unit selected from the plurality of computing units that comprise the active application;

creating, via the active application, a thread context array based at least in part on the computing unit source code, wherein the thread context array comprises the first and second context;

providing, to the scheduler module, thermal data associated with the computing device;

determining, via the scheduler module, a thermal level based at least in part on the thermal data;

providing, to the scheduler module, power supply data associated with the computing device;

determining, via the scheduler module, a current power source and/or a battery charge level based at least in part on the power supply data;

providing, to the scheduler module, load data from the heterogenous group of processors, wherein the load data indicates available load for individual processors;

detecting, via the scheduler module, individual processors of the heterogenous group of processors based at least in part on the load data;

wherein the determination of the distribution of the computing unit source code to the heterogenous group of processors is based at least in part on one or more of the load data, the determination of the thermal level, and the determination of the current power source and/or a battery charge level, wherein the providing of the first binary version of the computing unit source code and the first context data to the first processor and the second binary version of the computing unit source code and the second context data to the second processor comprises:

launching, via the scheduler module, a dispatch module associated with the scheduler module;

determining, via the dispatch module, when one of the first processor and/or second processors become available based at least in part on load data from the heterogenous group of processors, wherein the load data indicates available load for individual processors; and providing the first binary version of the computing unit source code and the first context data to the first processor and the second binary version of the computing unit source code and the second context data to the second processor via the dispatch module in response to the first processor and/or second processors becoming available.

12. An apparatus comprising:
a heterogenous group of processors;
one or more memory storages communicatively coupled to the heterogenous group of processors; and
a scheduling component of a processor of the heterogenous group of processors to:
initiate a request for scheduling processing of a plurality of computing units and context data associated with the active application, wherein the request for scheduling is provided to a scheduler module and comprises computing unit source code and context data associated with the source code, wherein the context data is part of data that is transferred from a memory of one or more memory stores to a heterogenous group of processes, wherein the data includes the source code associated with an active application;
obtain thermal data or power supply data associated with a computing device; and
determine the distribution of the computing unit source code and context data to the heterogenous group of processors depending on one or more of the thermal data and the power supply data, wherein the heterogenous group of processors comprises at least a first processor and a second processor, wherein the second processor is of a different type than the first processor, wherein a first binary version and a second binary version of the computing unit source code and the context data are provided to the first processor and the second processor, respectively, such that the computing unit source code and the context data from a single computing unit is distributed to the first and second processors of different types, wherein the first binary version and the second binary version of the computing unit source code are compiled just-in-time, wherein the first binary version of the computing unit source code is compatible with the first processor and the second binary version of the computing unit source code is compatible with the second processor, wherein overhead associated with the just-in-time compilation is reduced using a just-in-time binary cache.

13. The apparatus of claim 12, wherein the scheduling component has the at least one of thermal and power supply data transferred to the scheduler module in response to a request for scheduling by the active application.

14. The apparatus of claim 12, wherein the scheduling component is further to:
receive load data from the heterogenous group of processors, wherein the load data indicates available load for individual processors; and
detect individual processors of the heterogenous group of processors based at least in part on the load data.

15. The apparatus of claim 12, wherein the scheduling component is further to:
receive load data from the heterogenous group of processors, wherein the load data indicates available load for individual processors; and
wherein the determination of the distribution of the computing unit source code to the heterogenous group of processors is based at least in part on the load data.

16. The apparatus of claim 12, wherein the scheduling component is further to:
obtain thermal data associated with the computing device;
determine a thermal level based at least in part on the thermal data; and
wherein the determination of the distribution of the computing unit source code to the heterogenous group of processors is based at least in part on the determination of the thermal level.

17. The apparatus of claim 12, wherein the scheduling component is further to:
obtain, power supply data associated with the computing device;
determine a current power source and/or a battery charge level based at least in part on the power supply data; and
wherein the determination of the distribution of the computing unit source code to the heterogenous group of processors is based at least in part on the determination of the current power source and/or a battery charge level.

18. The apparatus of claim 12, wherein the scheduling component is further to:
compile the first binary version and the second binary version of the computing unit source code, wherein the first binary version of the computing unit source code is compatible with the first processor and the second binary version of the computing unit source code is compatible with the second processor.

19. The apparatus of claim 18, wherein the scheduling component is further to:
- launch a dispatch module associated with the scheduler module;
- determine, when one of the first processor and/or second processors become available based at least in part on load data from the heterogenous group of processors, wherein the load data indicates available load for individual processors; and
- provide the first binary version of the computing unit source code and the first context data to the first process or and the second binary version of the computing unit source code and the second context data to the second processor via the dispatch module in response to the first processor and/or second processors becoming available.

20. The apparatus of claim 12, wherein the heterogenous group of processors comprises at least a first processor and a second processor, wherein the second processor is of a different type than the first processor, and the scheduling component is further to:
- load the computing unit source code, wherein the computing unit source code comprises an individual computing unit selected from the plurality of computing units that comprise the active application;
- create a thread context array based at least in part on the computing unit source code, wherein the thread context array comprises the first and second context;
- obtain thermal data associated with the computing device;
- determine a thermal level based at least in part on the thermal data;
- provide power supply data associated with the computing device;
- determine a current power source and/or a battery charge level based at least in part on the power supply data;
- obtain, load data from the heterogenous group of processors, wherein the load data indicates available load for individual processors;
- detect individual processors of the heterogenous group of processors based at least in part on the load data;
- wherein the determination of the distribution of the computing unit source code to the heterogenous group of processors is based at least in part on one or more of the load data, the determination of the thermal level, and the determination of the current power source and/or a battery charge level,
- wherein the providing of the first binary version of the computing unit source code and the first context data to the first processor and the second binary version of the computing unit source code and the second context data to the second processor comprises:
  - launch a dispatch module associated with the scheduler module;
  - determine when one of the first processor and/or second processors become available based at least in part on load data from the heterogenous group of processors, wherein the load data indicates available load for individual processors; and
  - providing the first binary version of the computing unit source code and the first context data to the first processor and the second binary version of the computing unit source code and the second context data to the second processor via the dispatch module in response to the first processor and/or second processors becoming available.

* * * * *